(12) United States Patent
Mashimo

(10) Patent No.: US 12,038,708 B2
(45) Date of Patent: Jul. 16, 2024

(54) IMAGE FORMING APPARATUS

(71) Applicant: KYOCERA Document Solutions Inc., Osaka (JP)

(72) Inventor: Takayuki Mashimo, Osaka (JP)

(73) Assignee: Kyocera Document Solutions, Inc. (JP)

( * ) Notice: Subject to any disclaimer, the term of this patent is extended or adjusted under 35 U.S.C. 154(b) by 0 days.

(21) Appl. No.: 18/323,619

(22) Filed: May 25, 2023

(65) Prior Publication Data

US 2023/0393509 A1 Dec. 7, 2023

(30) Foreign Application Priority Data

Jun. 2, 2022 (JP) .................. 2022-090506

(51) Int. Cl.
*G03G 15/00* (2006.01)
*G03G 15/01* (2006.01)
*G06K 15/12* (2006.01)

(52) U.S. Cl.
CPC ......... *G03G 15/50* (2013.01); *G03G 15/0142* (2013.01); *G06K 15/1219* (2013.01); *G06K 15/129* (2013.01)

(58) Field of Classification Search
CPC ............. G03G 15/043; G03G 15/0131; G03G 15/5058
See application file for complete search history.

(56) References Cited

U.S. PATENT DOCUMENTS

2016/0077459 A1   3/2016 Ricoh
2018/0004115 A1*  1/2018 Iwata .................. G03G 15/043
2019/0377278 A1* 12/2019 Maeda ................ G03G 15/043

FOREIGN PATENT DOCUMENTS

JP    2016-061896   4/2016
JP    2022-020979   2/2022

* cited by examiner

*Primary Examiner* — Jessica L Eley

(57) ABSTRACT

Plural write control units independently control plural print mechanisms corresponding to plural toner colors. A controller stores a setting value for each page into a first memory area. Plural second memory areas respectively correspond to the plural write control units. Further, one write control unit among them transfers the setting value from the first memory area to the second memory area of this write control unit, and applies the setting value stored in the second memory area and causes the corresponding print mechanism to print a page image. Another write control unit among them transfers the setting value to the second memory area of this write control unit from the second memory area of another write control unit among them, and applies the setting value stored in the second memory area and causes the corresponding print mechanism to print a page image.

7 Claims, 8 Drawing Sheets

IMAGE FORMING APPARATUS

CROSS-REFERENCE TO RELATED APPLICATIONS

This application relates to and claims priority rights from Japanese Patent Application No. 2022-090506, filed on Jun. 2, 2022, the entire disclosures of which are hereby incorporated by reference herein.

BACKGROUND

1. Field of the Present Disclosure

The present disclosure relates to an image forming apparatus.

2. Description of the Related Art

An image forming apparatus includes plural print mechanisms (such as photoconductor drum, exposure device, and development device) respectively corresponding to plural toner colors (e.g. Cyan, Magenta, Yellow, and Black), and includes a write control unit that controls the print mechanisms and thereby causes the print mechanisms to perform printing of the corresponding toner colors. Further in an image forming apparatus, such a write control unit receives a setting value of a parameter for performing printing from a controller and stores the setting value into first memory means, and thereafter transfers the setting value to second memory means for each page at a predetermined time point before printing a page image of the page, applies the setting value and causes the print mechanisms to perform printing of the page image.

Meanwhile, in order to restrain unevenness of pixel widths that occurs in an electrostatic latent image due to an optical system or the like in an exposure device, an image forming apparatus determines a pixel (timing) of which a pixel width should be corrected, using a pseudorandom sequence, and corrects a pixel width of the determined pixel by modifying a light emitting time of the exposure device.

The aforementioned image forming apparatus includes a double buffer configuration using the first memory means and the second memory means. However, when plural write control units corresponding to plural toner color independently operate and a controller provides the aforementioned setting value to the plural write control units, the controller is required to watch asynchronous print start time points of page images of the plural toner colors and provide the aforementioned setting value to the plural write control units at respective proper time points before the print start time points. Therefore, the controller is required to perform a complicated process and consequently, it may be delayed to apply the aforementioned setting value and to start printing of the page images.

SUMMARY

An image forming apparatus of an aspect of the present disclosure includes plural print mechanisms corresponding to plural toner colors, plural write control units, a first memory area, a controller, and plural second memory areas respectively corresponding to the plural write control units. The plural write control units are configured to independently control the plural print mechanisms and cause the plural print mechanisms to perform printing of the plural toner colors. The controller is configured to store a setting value for each page into the first memory area. Further, one write control unit among the plural write control units transfers the setting value from the first memory area to the second memory area of this write control unit, and applies the setting value stored in the second memory area and causes the corresponding print mechanism to print a page image; and another write control unit among the plural write control units transfers the setting value to the second memory area of this write control unit from the second memory area of another write control unit among the plural write control units, and applies the setting value stored in the second memory area and causes the corresponding print mechanism to print a page image.

These and other objects, features and advantages of the present disclosure will become more apparent upon reading of the following detailed description along with the accompanied drawings.

DETAILED DESCRIPTION

Hereinafter, embodiments according to an aspect of the present disclosure will be explained with reference to drawings.

Embodiment 1

Figure 1:
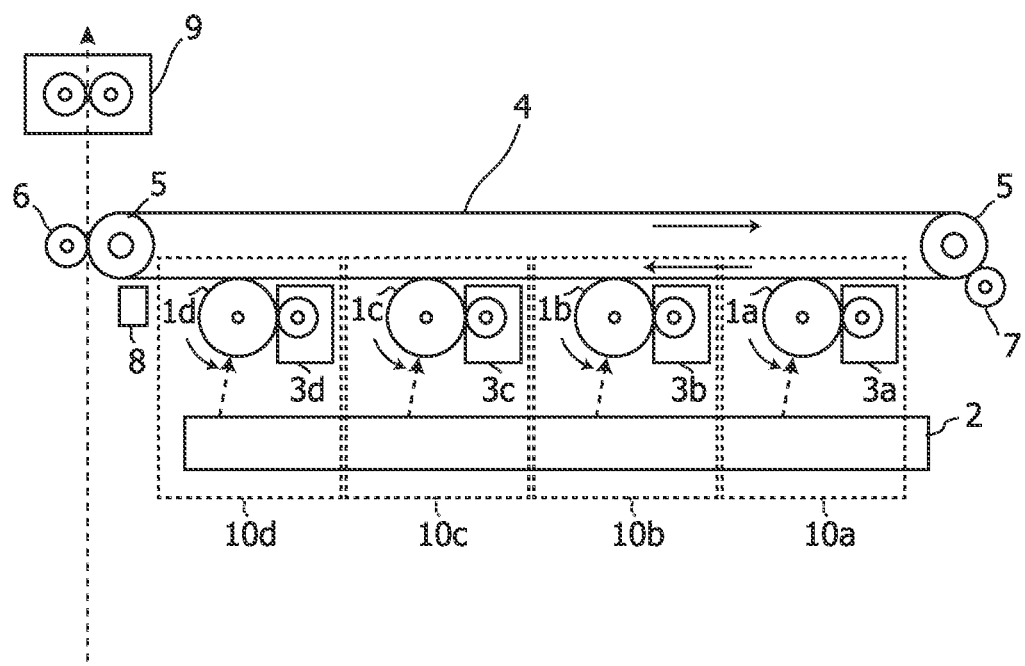
FIG. 1 shows a side view that indicates an internal mechanical configuration of an image forming apparatus in an embodiment according to the present disclosure.

FIG. 1 shows a side view that indicates an internal mechanical configuration of an image forming apparatus in an embodiment according to the present disclosure. The image forming apparatus shown in FIG. 1 is an apparatus having an electrophotographic printing function, such as a printer, a facsimile machine, a copier or a multi function peripheral.

The image forming apparatus in this embodiment includes a tandem-type print engine. This print engine includes photoconductor drums 1a to 1d, an exposure device 2, and development devices 3a to 3d. The photoconductor drums 1a to 1d are photoconductors of four toner colors: Cyan, Magenta, Yellow and Black.

The exposure device 2 scans plural laser beams and irradiates the photoconductor drums 1a to 1d with the laser light beams and thereby forms electrostatic latent images of respective color planes of a print image (page image) on the photoconductor drums 1a to 1d. The exposure device 2 includes a laser diode as a light source of the laser light beams, optical elements (such as lens, mirror and polygon mirror) that guide the laser light beams to the photoconductor drums 1a to 1d.

Further, the periphery of each one of the photo conductor drums 1a to 1d includes a charging unit such as scorotron, a cleaning device, a static electricity eliminator and the like. The cleaning device removes residual toner on each one of the photo conductor drums 1a to 1d after primary transfer. The static electricity eliminator eliminates static electricity of each one of the photoconductor drums 1a to 1d after primary transfer.

Toner cartridges which contain toner of four colors: Cyan, Magenta, Yellow and Black are attached to the development devices 3a to 3d, respectively. In the development devices 3a to 3d, the toner is supplied from the toner cartridges, and this toner and carrier compose developer. The development devices 3a to 3d cause the toner to adhere to the photoconductor drums 1a to 1d and thereby form toner images.

A print mechanism 10a includes the photoconductor drum 1a, the exposure device 2, and the development device 3a, and performs development of a toner image (e.g. Black); a print mechanism 10b includes the photoconductor drum 1b, the exposure device 2, and the development device 3b, and performs development of another toner image (e.g. Magenta); a print mechanism 10c includes the photoconductor drum 1c, the exposure device 2, and the development device 3c, and performs development of another toner image (e.g. Cyan); and a print mechanism 10d includes the photoconductor drum 1d, the exposure device 2, and the development device 3d, and performs development of another toner image (e.g. Yellow).

The intermediate transfer belt 4 is a loop-shaped image carrier, and contacts the photoconductor drums 1a to 1d. Toner images on the photoconductor drums 1a to 1d are primarily transferred onto the intermediate transfer belt 4. The intermediate transfer belt 4 is hitched around driving rollers 5, and rotates by driving force of the driving rollers 5 towards the direction from the contact position with the photoconductor drum 1d to the contact position with the photoconductor drum 1a.

A transfer roller 6 causes an incoming paper sheet in transportation to contact the transfer belt 4, and secondarily transfers the toner image on the transfer belt 4 to a print sheet. The print sheet on which the toner image has been transferred is transported to a fuser 9, and consequently, the toner image is fixed on the print sheet.

A roller 7 has a cleaning brush, and removes residual toner on the intermediate transfer belt 4 by contacting the cleaning brush to the intermediate transfer belt 4 after transferring the toner image to a print sheet.

A sensor 8 is an optical sensor used to measure a density of a developed toner image, and irradiates the intermediate transfer belt 4 with a light beam and detects its reflection light. For example, in toner density adjustment, the sensor 8 irradiates a predetermined area on the intermediate transfer belt 4 with a light beam, detects its reflection light, and outputs an electrical signal corresponding to the detected intensity of the reflection light.

Figure 2:
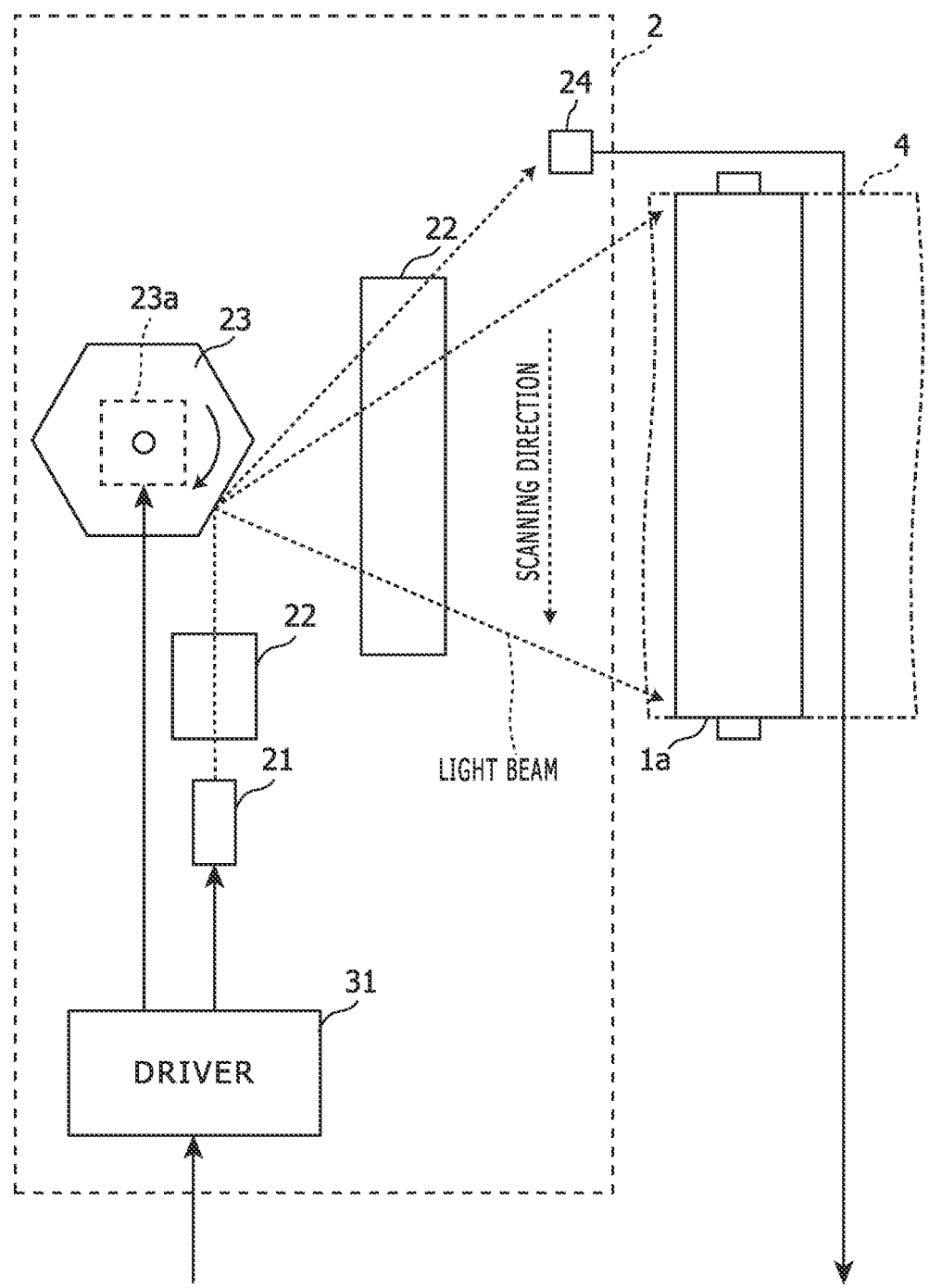
FIG. 2 shows a diagram that indicates a partial configuration (a configuration of one toner color) of an exposure device 2 shown in FIG. 1.

FIG. 2 shows a diagram that indicates a partial configuration (a configuration of one toner color) of an exposure device 2 shown in FIG. 1.

In FIG. 2, a light emitting element 21 is a light emitting element such as a laser diode that generates the aforementioned laser light beam. An optical system 22 includes lenses arranged between the laser diode 21 and a polygon mirror 23 and/or between the polygon mirror 23 and the photoconductor drum 1a and a BD sensor 24. In the optical system 22, an f-Theta lens and/or the like is used.

Further, the polygon mirror 23 is an element that includes an axis perpendicular to an axis of the photoconductor drum 1a, has a polygonal cross section perpendicular to the own axis, and has sides that form mirrors. The polygon mirror 23 rotates around the own axis, and scans the laser light emitted from the light emitting element 21 along an axis direction of the photoconductor drum 1a (i.e. along a primary scanning direction). A polygon motor 23a causes the polygon mirror 23 to rotate in accordance with a control signal provided from a controller 41 (mentioned below) or the like.

Further, the BD sensor 24 is arranged at a predetermined detection position and detects a time point that the laser light beam is scanned through the detection position and outputs a BD signal that indicates the detected time point. When light enters the BD sensor 24, the BD sensor 24 induces an output voltage corresponding to an amount of the light. The BD sensor 24 is arranged at a predetermined position on a line along which the laser light beam is scanned, detects a time point that the laser light beam is scanned through this predetermined position and outputs as the BD signal a pulse formed at this time point.

A driver 31 includes a light source control circuit that controls the light emitting element 21 and causes the light emitting element 21 to emit the laser light beam, a motor driving circuit that drives the aforementioned motor 23a, and the like. The light source control circuit performs light emitting control of the light emitting element 21 such that the exposure is performed using the laser light beam with a pattern corresponding to an image to be formed in synchronization with a horizontal synchronization signal.

Figure 3:
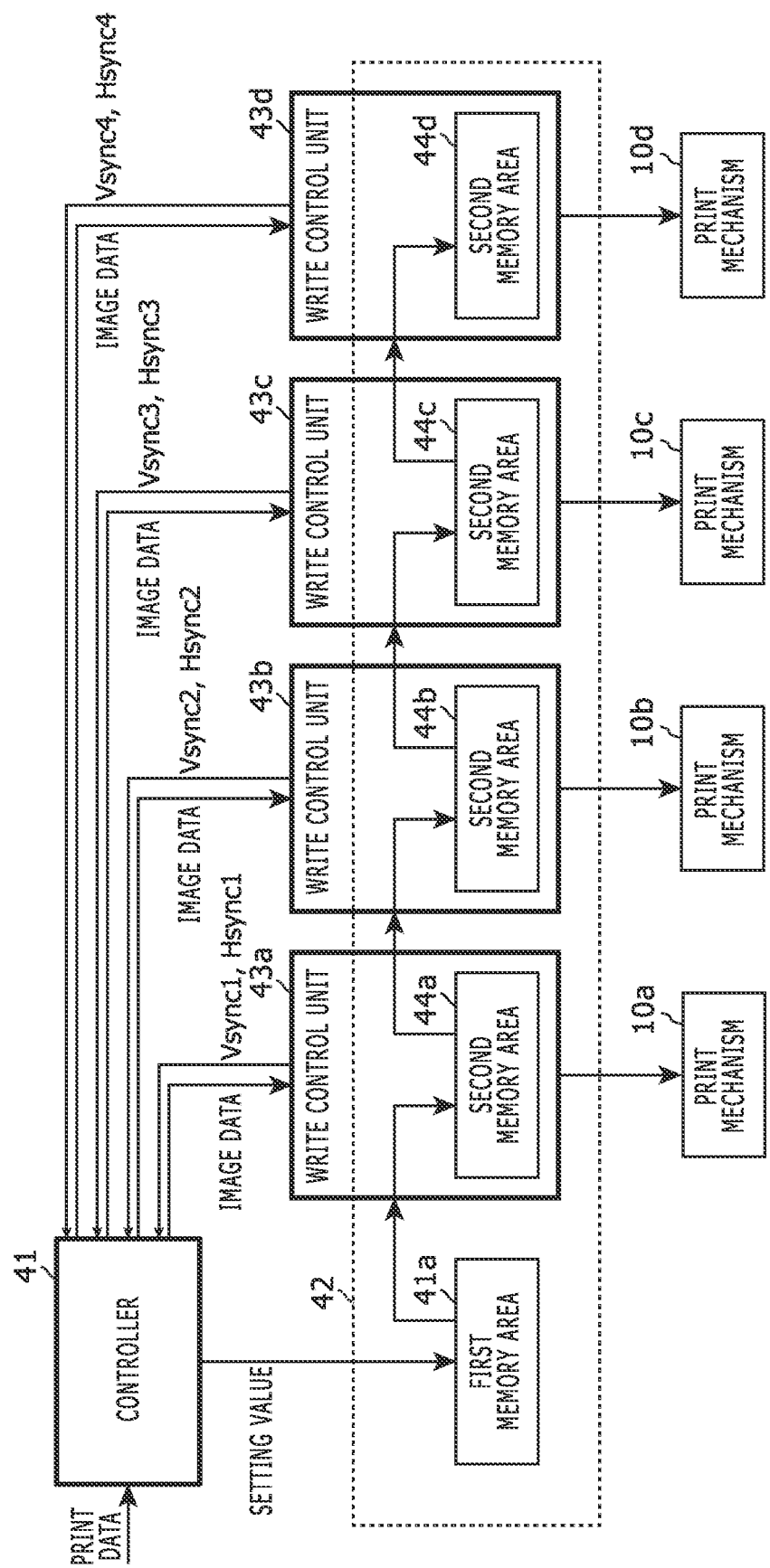
FIG. 3 shows a block diagram that indicates an electronic configuration of the image forming apparatus shown in FIGS. 1 and 2.

FIG. 3 shows a block diagram that indicates an electronic configuration of the image forming apparatus shown in FIGS. 1 and 2. As shown in FIG. 3, for example, this image forming apparatus further includes a controller 41, a memory 42 such as RAM (Random Access Memory), and plural write control units 43a to 43d corresponding to plural (here, four) toner colors.

The controller 41 is a computer that executes a predetermined program using a processor such as CPU (Central Processing Unit); and receives print data provided from a host device or the like, performs a predetermined image process (color conversion, halftoning and the like) for the print data, and thereby generates print image data for each toner color. Further, the controller 41 determines a setting value of a parameter of printing on the basis of a printing condition specified by a user or the like, a type of a print sheet to be used for printing, and/or the like.

The memory 42 is a rewritable memory device, and in the memory 42, a first memory area 41a is allocated, and second memory areas 44a to 44d corresponding to the write control units 43a to 43d are allocated. The first memory area 41a and the second memory areas 44a to 44d may be allocated in different memories.

The plural write control units 43a to 43d are hardware parts that operate independently from each other, and independently control the plural print mechanisms 10a to 10d and cause the plural print mechanisms 10a to 10d to perform printing of the plural toner colors (CMYK).

Figure 4:
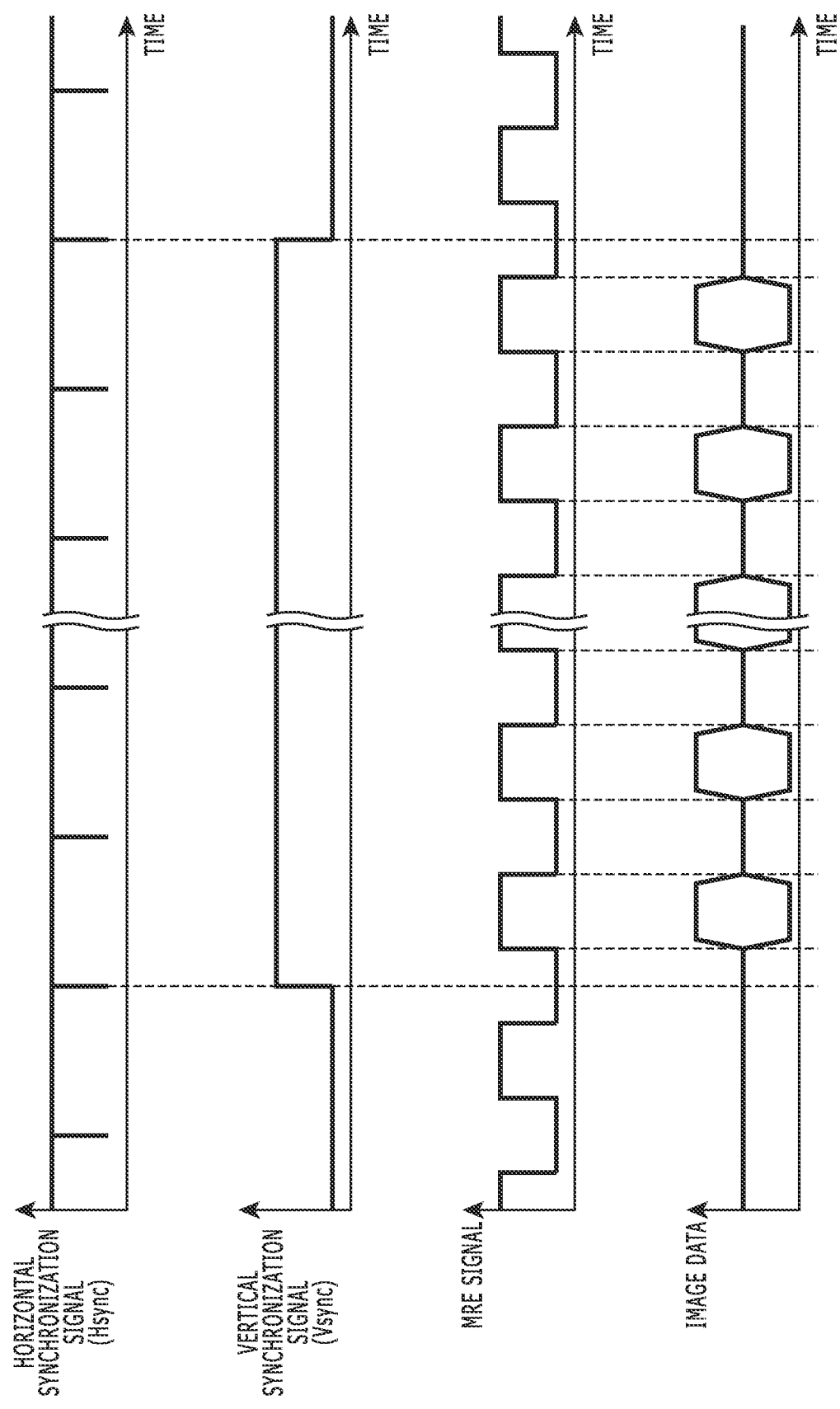
FIG. 4 shows a timing chart that explains transfer of image data in the image forming apparatus in Embodiment 1.

FIG. 4 shows a timing chart that explains transfer of image data in the image forming apparatus in Embodiment 1. The write control units 43*a* to 43*d* generate vertical synchronization signals (Vsync1 to Vsync4) for each page and horizontal synchronization signals (Hsync1 to Hsync4) for each line on the basis of the BD signal, respectively; and receive image data from the controller 41 in synchronization with the horizontal synchronization signal (Hsync1 to Hsync4) in an assert period of an image validity signal (MRE (Memory Read Enable) signal).

Further, regarding plural page images to be printed, the controller 41 stores a setting value for each page into the first memory area 41*a*.

The write control unit 43*a* transfers the setting value from the first memory area 41*a* to the second memory area 44*a* of this write control unit 43*a*, and applies the setting value stored in this second memory area 44*a* and causes the corresponding print mechanism 10*a* to print a page image.

The other write control units 43*b* to 43*d* transfer the setting value from the second memory areas 44*a*, 44*b* and 44*c* of other (previous) write control units 43*a*, 43*b* and 43*c* to the own second memory areas 44*b*, 44*c* and 44*d*, respectively in turn, and each of the write control units 43*b* to 43*d* applies the setting value stored in the own second memory area 44*b*, 44*c* or 44*d* and causes the corresponding print mechanism 10*b*, 10*c* or 10*d* to print a page image.

In Embodiment 1, when continuously printing plural page images, in a negate period from an end of an assert period of the vertical synchronization signal Vsync1, Vsync2, Vsync3 or Vsync4 corresponding to a page image among the plural page images to a start of an assert period of the vertical synchronization signal Vsync1, Vsync2, Vsync3 or Vsync4 corresponding to a next page image among the plural page images, each of the plural write control units transfers the setting value for the next page image in synchronization with the corresponding BD signal.

Further, the exposure device 2 causes the light emitting element 21 to perform forcible light emission for a predetermined period when a scanning position of the laser beam gets identical to the detection position, and the plural write control units 43*a* to 43*d* transfer the setting value for the next page image at a start time point of the forcible light emission. As mentioned, the setting value for the next page image is transferred using a start time point of the forcible light emission as a trigger, and consequently, the setting value for the next page image is certainly transferred before a start of printing the next page image and certainly applied to the printing of the next page image. The write control units 43*a* to 43*d* operate asynchronously to the controller 41 (i.e. asynchronously to writing the setting value into the first memory area 41*a*), and therefore, if the setting value for the next page image is transferred after detection of the BD signal, then the setting value for the next page image may not be transferred until a start of printing the next page image. Contrarily, here the setting value for the next page image is transferred using a start time point of the forcible light emission as a trigger, and therefore, the setting value for the next page image is certainly transferred before a start of printing the next page image.

For example, the aforementioned setting value includes the number of pulses in the horizontal synchronization signal per period of the aforementioned BD signal. For example, the number of pulses in the horizontal synchronization signal per period of the aforementioned BD signal is changed in order to change a resolution of a primary scanning direction. Further, for example, if a linear velocity is changed to a half of it without changing the resolution, one pulse of the horizontal synchronization signal is generated per two periods of the BD signal.

The following part explains a behavior of the image forming apparatus 1 in Embodiment 1.

Figure 5:
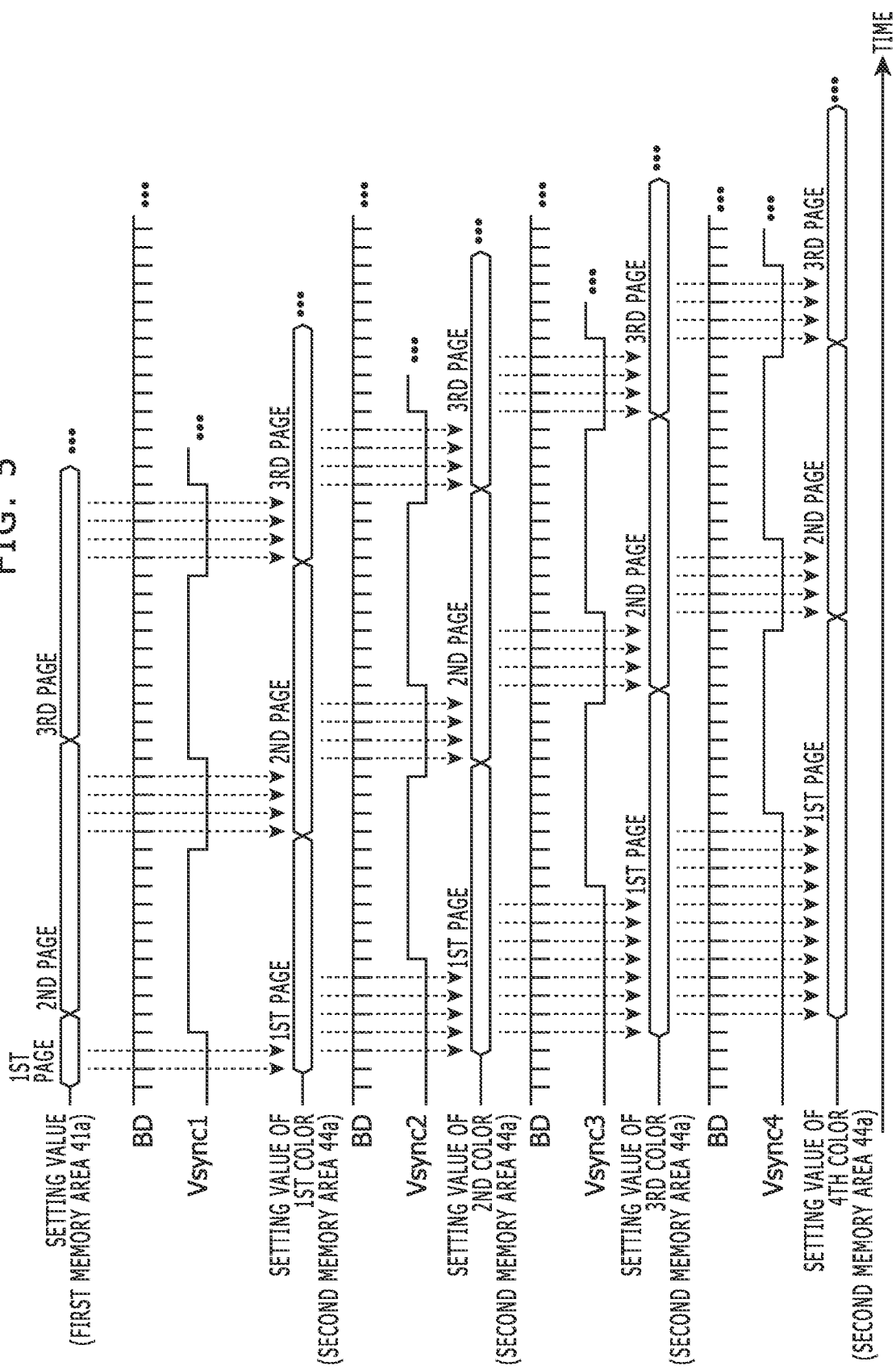
FIG. 5 shows a timing chart that explains transfer of a setting value in the image forming apparatus in Embodiment 1.

FIG. 5 shows a timing chart that explains transfer of a setting value in the image forming apparatus in Embodiment 1. As shown in FIG. 5, for example, after a setting value for the first page is stored into the first memory area 41*a*, the write control unit 43*a* transfers the setting value for the first page from the first memory area 41*a* to the own second memory area 44*a* in synchronization with the BD signal (here, a start time point of the forcible light emission period for the BD signal) in a negate period of the vertical synchronization signal Vsync1 of the write control unit 43*a*, and in accordance with this setting value of the first page, causes the print mechanism 10*a* to perform printing of a page image (a page image of the first toner color) of the first page.

After the setting value for the first page is transferred from the first memory area 41*a* to the second memory area 44*a*, the write control unit 43*b* transfers the setting value for the first page from the second memory area 44*a* of the previous write control unit 43*a* to the own second memory area 44*b* in synchronization with the BD signal (here, a start time point of the forcible light emission period for the BD signal) in a negate period of the vertical synchronization signal Vsync2 of the write control unit 43*b*, and in accordance with this setting value of the first page, causes the print mechanism 10*b* to perform printing of a page image (a page image of the second toner color) of the first page.

Similarly, after the setting value for the first page is transferred from the second memory area 44*a* to the second memory area 44*b*, the write control unit 43*c* transfers the setting value for the first page from the second memory area 44*b* of the previous write control unit 43*b* to the own second memory area 44*c* in synchronization with the BD signal (here, a start time point of the forcible light emission period for the BD signal) in a negate period of the vertical synchronization signal Vsync3 of the write control unit 43*c*, and in accordance with this setting value of the first page, causes the print mechanism 10*c* to perform printing of a page image (a page image of the third toner color) of the first page.

Similarly, after the setting value for the first page is transferred from the second memory area 44*b* to the second memory area 44*c*, the write control unit 43*d* transfers the setting value for the first page from the second memory area 44*c* of the previous write control unit 43*c* to the own second memory area 44*d* in synchronization with the BD signal (here, a start time point of the forcible light emission period for the BD signal) in a negate period of the vertical synchronization signal Vsync4 of the write control unit 43*d*, and in accordance with this setting value of the first page, causes the print mechanism 10*d* to perform printing of a page image (a page image of the fourth toner color) of the first page.

As mentioned, as a pipeline process, the setting value is transferred to the second memory areas 44*a* to 44*d* in a cascade manner.

Further, similarly, a setting value for the second page or each of subsequent pages is transferred in next and subsequent negate periods of the vertical synchronization signals Vsync1 to Vsync4 from the memory area 41*a*, 44*a*, 44*b* or 44*c* as a previous memory area, as a pipeline process, and in accordance with the setting value, printing a page image is performed.

Figure 6:
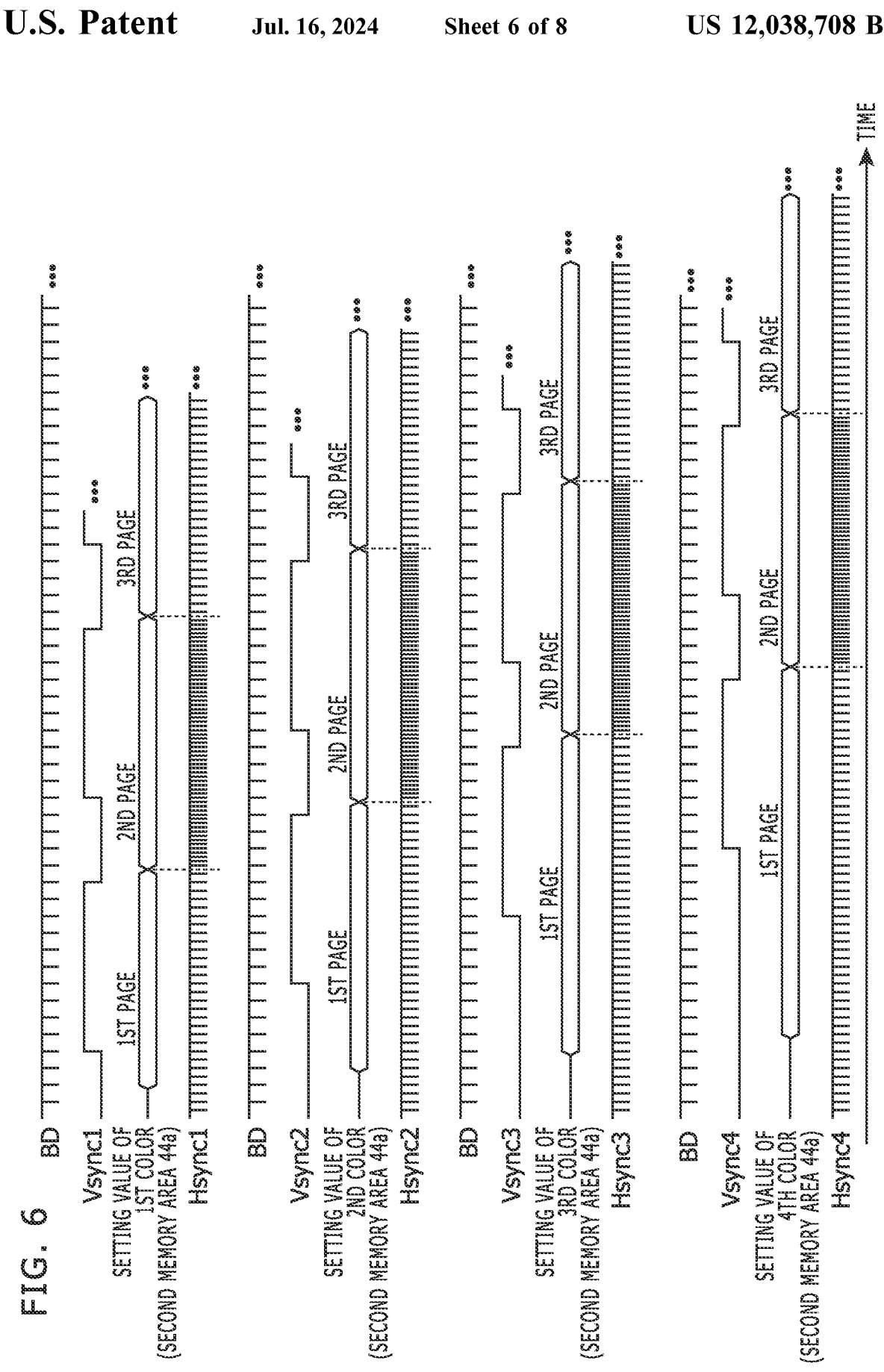
FIG. 6 shows a timing chart that explains a case that resolution is changed in a page interval in the image forming apparatus in Embodiment 1.

Here, the following part explains a case that a resolution is changed in a page interval. FIG. 6 shows a timing chart that explains a case that resolution is changed in a page interval in the image forming apparatus in Embodiment 1. If the aforementioned setting value includes a setting value of a resolution (primary scanning directional resolution) of each page, the setting values (primary scanning directional resolutions) for the first page and the third page are set as a default value, and the setting value (primary scanning directional resolution) for the second page is set as twice of the default value, then as shown in FIG. 6, a period of the horizontal synchronization signals Hsync1 to Hsync4 of the second page is set as a half of a period of the horizontal synchronization signals Hsync1 to Hsync4 of the first and third pages.

Here, a single polygon mirror 23 scans laser light beams of all toner colors and a single BD signal is generated. Alternatively, plural polygon mirrors 23 may scan laser light beams of plural toner colors, respectively. In such a case, plural BD signals are generated for the plural toner colors, respectively, and for the plural toner colors, the vertical synchronization signals and the horizontal synchronization signals are generated in accordance with the BD signals, respectively.

Further, the aforementioned setting value may be common to all the toner colors or may be different for plural toner colors. In such a case, setting values for all toner colors may be transferred to the last second memory area 44*d*. Alternatively, in a certain write control unit, only one or more setting values for one or more toner colors corresponding to this write control unit and one or more subsequent write control units may be transferred from a previous write control unit, and only one or more setting values for one or more toner colors corresponding to the subsequent write control unit(s) may be transferred to the subsequent write control unit(s).

As mentioned, in Embodiment 1, a write control unit 43*a* among the plural write control units 43*a* to 43*d* transfers the setting value from the first memory area 41*a* to the second memory area 44*a* of this write control unit 43*a*, and applies the setting value stored in this second memory area 44*a* and causes the corresponding print mechanism 10*a* to print a page image. Further, the other write control units 43*b* to 43*d* transfer the setting value from the second memory areas 44*a*, 44*b* and 44*c* of other write control units 43*a*, 43*b* and 43*c* to the own second memory areas 43*b*, 43*c* and 43*d*, respectively, and the write control units 43*b* to 43*d* apply the setting value stored in the own second memory areas 44*b*, 44*c* and 44*d* and cause the corresponding print mechanisms 10*b*, 10*c* and 10*d* to print page images, respectively.

Consequently, using a relatively simple configuration, a setting value for each page image of printing for plural toner colors is transferred at a proper time point, and applied to printing of the page image.

Further, even if there is a difference between the assert periods of plural toner colors, the setting value is smoothly transferred to the second memory areas 44*a* to 44*d*; and even if an interval between print sheets (i.e. a negate period of the vertical synchronization signal) is short and the assertion for the first color of a current page occurs before the assertion for the fourth color of a previous page, the transfer of the first color of the current page is finished without using plural-stage FIFO.

Embodiment 2

In Embodiment 2, similarly to the aforementioned image forming apparatus, in order to restrain unevenness of pixel widths that occurs in an electrostatic latent image due to an optical system in the exposure device 2, the exposure device 2 determines a pixel of which a pixel width should be corrected, using a pseudorandom sequence, and corrects a pixel width of the determined pixel by modifying an light emitting time of the light emitting element 21; and the pseudorandom sequence is generated continuously from an line to a next line to be drawn in the page image, and is renewed line by line.

Further, in Embodiment 2, the light emitting element 21 is a multi-beam element capable of generating plural laser beams for a page image of each toner color; and the exposure device 2 allows turning on of all of the plural laser beams for a line in the page image and forbids turning on of a part of the plural laser beams for another line in the page image. When turning on of a part of the plural laser beams is forbidden, renewal of the pseudorandom sequence is stopped for this part of the plural laser beams. The aforementioned setting value specifies whether this intermittent light emission of the part of the laser light beams is performed or not for each page image, namely specifies a line for which the renewal of the pseudorandom sequence is stopped.

Other parts of the configuration and behaviors of the image forming apparatus in Embodiment 2 are identical or similar to those in Embodiment 1, and therefore not explained here.

As mentioned, in Embodiment 2, continuity of the pseudorandom sequence is properly maintained over a line that the laser light beam is not turned on.

Embodiment 3

Figure 7:
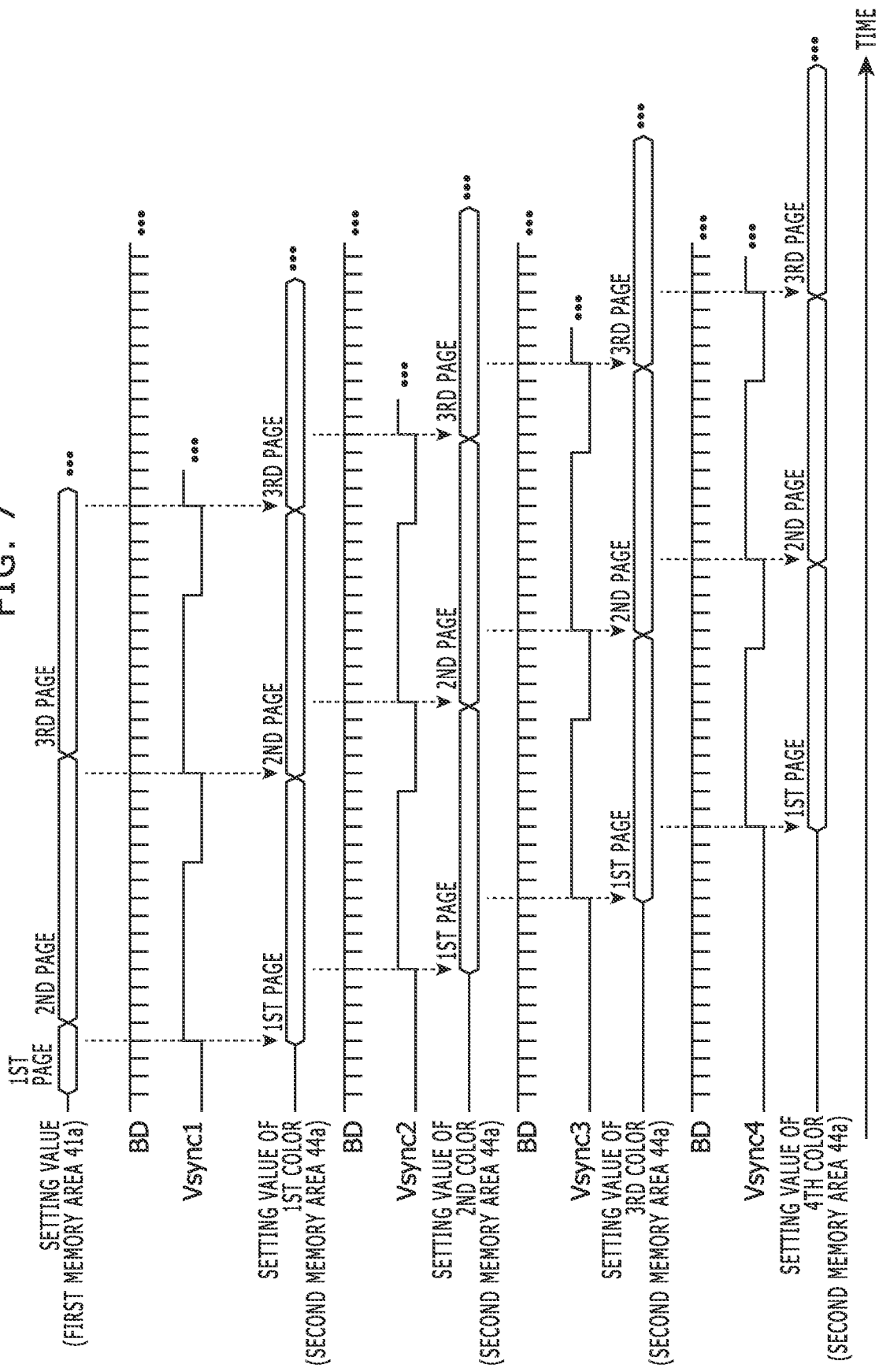
FIG. 7 shows a timing chart that explains transfer of a setting value in the image forming apparatus in Embodiment 3.

FIG. 7 shows a timing chart that explains transfer of a setting value in the image forming apparatus in Embodiment 3.

In Embodiment 3, when continuously printing plural page images, as shown in FIG. 7, for example, at a start time point (i.e. a rising timing) of an assert period of the vertical synchronization signals Vsync1 to Vsync4 corresponding to a page image among the plural page images, the plural write control units 43*a* to 43*d* transfer the setting value for this page image from the previous memory areas 41*a*, 44*a*, 44*b* and 44*c*.

Other parts of the configuration and behaviors of the image forming apparatus in Embodiment 3 are identical or similar to those in Embodiment 1 or 2, and therefore not explained here.

Embodiment 4

Figure 8:
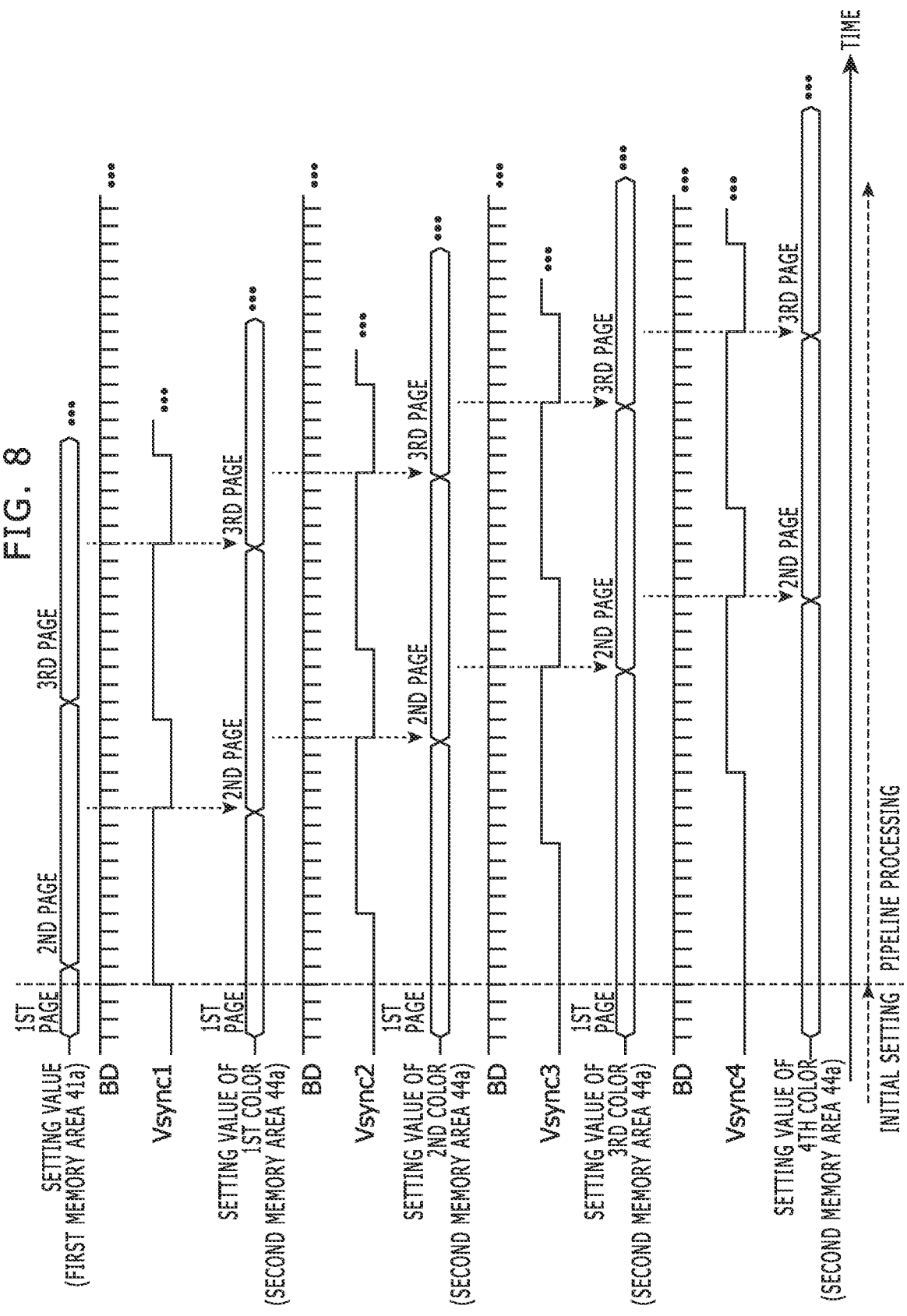
FIG. 8 shows a timing chart that explains transfer of a setting value in the image forming apparatus in Embodiment 4.

FIG. 8 shows a timing chart that explains transfer of a setting value in the image forming apparatus in Embodiment 4.

In Embodiment 4, when continuously printing plural page images, as shown in FIG. 8, for example, at an end time point (i.e. a falling timing) of an assert period of the vertical synchronization signals Vsync1 to Vsync4 corresponding to a page image among the plural page images, the plural write control units 43*a* to 43*d* transfer the setting value for a next page image from the previous memory areas 41*a*, 44*a*, 44*b* and 44*c*. It should be noted that in Embodiment 4 a setting value for the first page is transferred as an initial value to the memory areas 41*a* and 44*a* to 44*d* in turn before a start of an assert period corresponding to the first page in the vertical synchronization signal Vsync1 of the write control unit 43*a*.

Other parts of the configuration and behaviors of the image forming apparatus in Embodiment 4 are identical or similar to those in Embodiment 1 or 2, and therefore not explained here.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming apparatus, comprising:
plural print mechanisms corresponding to plural toner colors;
plural write control units configured to independently control the plural print mechanisms and cause the plural print mechanisms to perform printing of the plural toner colors;
a first memory area;
a controller configured to store a setting value for each page into the first memory area; and
plural second memory areas respectively corresponding to the plural write control units;
wherein one write control unit among the plural write control units transfers the setting value from the first memory area to the second memory area of this write control unit, and applies the setting value stored in the second memory area and causes the corresponding print mechanism to print a page image; and
another write control unit among the plural write control units transfers the setting value to the second memory area of this write control unit from the second memory area of another write control unit among the plural write control units, and applies the setting value stored in the second memory area and causes the corresponding print mechanism to print a page image.

2. The image forming apparatus according to claim 1, wherein the plural print mechanisms comprise plural photoconductor drums corresponding to the plural toner colors, and an exposure device that scans plural laser beams and irradiates the plural photoconductor drums with the laser beams;
the exposure device comprises a light emitting element that generates the laser beams, an optical sensor that is arranged at a predetermined detection position and detects a time point that the laser beam is scanned through the detection position and outputs a BD signal that indicates the detected time point; and
when continuously printing plural page images, in a negate period from an end of an assert period of a vertical synchronization signal corresponding to a page image among the plural page images to a start of an assert period of a vertical synchronization signal corresponding to a next page image among the plural page images, the plural write control units transfer the setting value for the next page image in synchronization with the BD signal.

3. The image forming apparatus according to claim 2, wherein the exposure device causes the light emitting element to perform forcible light emission for a predetermined period when a scanning position of the laser beam gets identical to the detection position; and
the plural write control units transfer the setting value for the next page image at a start time point of the forcible light emission.

4. The image forming apparatus according to claim 2, wherein the setting value includes a number of pulses in a horizontal synchronization signal per period of the BD signal.

5. The image forming apparatus according to claim 2, wherein in order to restrain unevenness of pixel widths that occurs in an electrostatic latent image due to an optical system in the exposure device, the exposure device determines a pixel of which a pixel width should be corrected, using a pseudorandom sequence, and corrects a pixel width of the determined pixel by modifying an light emitting time of the exposure device;
the pseudorandom sequence is generated continuously from an line to a next line to be drawn in the page image, and is renewed line by line;
the light emitting element is capable of generating plural laser beams for the page image;
the exposure device allows turning on of all of the plural laser beams for a line in the page image and forbids turning on of a part of the plural laser beams for another line in the page image;
when turning on of a part of the plural laser beams is forbidden, renewal of the pseudorandom sequence is stopped for this part of the plural laser beams; and
the setting value specifies a line for which the renewal of the pseudorandom sequence is stopped.

6. The image forming apparatus according to claim 1, wherein when continuously printing plural page images, at a start time point of an assert period of a vertical synchronization signal corresponding to a page image among the plural page images, the plural write control units transfer the setting value for this page image.

7. The image forming apparatus according to claim 1, wherein when continuously printing plural page images, at an end time point of an assert period of a vertical synchronization signal corresponding to a page image among the plural page images, the plural write control units transfer the setting value for a next page image.

* * * * *